(12) United States Patent
Li et al.

(10) Patent No.: US 10,885,378 B2
(45) Date of Patent: Jan. 5, 2021

(54) CONTAINER IMAGE MANAGEMENT

(71) Applicant: International Business Machines Corporation, Armonk, NY (US)

(72) Inventors: Guang Cheng Li, Beijing (CN); Qi Ming Teng, Beijing (CN); Yong Zheng, Beijing (CN); Lin Feng Shen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 16/405,122

(22) Filed: May 7, 2019

(65) Prior Publication Data

US 2020/0356806 A1 Nov. 12, 2020

(51) Int. Cl.
*G06K 9/62* (2006.01)
*G06T 1/00* (2006.01)
*G06F 9/54* (2006.01)

(52) U.S. Cl.
CPC .......... *G06K 9/6215* (2013.01); *G06T 1/0007* (2013.01)

(58) Field of Classification Search
CPC .......... G06F 61/51; G06F 67/10; G06F 67/28; G06F 67/3838; G06F 67/1095; G06F 67/1097; G06F 67/2852; G06F 8/60; G06F 9/54; G06F 9/545; G06F 2113/20; G06F 16/901–16/902
See application file for complete search history.

(56) References Cited

U.S. PATENT DOCUMENTS

| 2018/0137174 A1 | 5/2018 | Cahana et al. |
| 2018/0189122 A1* | 7/2018 | Jobi ................. G06F 9/455 |
| 2018/0276215 A1 | 9/2018 | Chiba et al. |

FOREIGN PATENT DOCUMENTS

CN   106506587 A   3/2017

OTHER PUBLICATIONS

Authors et. al.: Disclosed Anonymously, "Method and Apparatus of Improving Container Images Pulling Efficiency in Distributed Container-based Cluster," IP.com No. IPCOM000253319D | IP.com Electronic Publication Date: Mar. 22, 2018.
Kangjin et at, "FID: A Faster Image Distribution System for Docker Platform," 2017 IEEE 2nd International Workshops on Foundations and Applications of Self* Systems (FAS*W).

* cited by examiner

*Primary Examiner* — Said M Elnoubi
(74) *Attorney, Agent, or Firm* — Patterson + Sheridan, LLP

(57) ABSTRACT

Embodiments of the present invention relate to methods, systems, and computer program products for container image management. In a method, an image layer in a container image may be received by one or more processors, and the container image is to be stored in an image server comprising a group of image layers. A base portion may be selected by one or more processors from the group of image layers based on a similarity analysis between the image layer and the group of image layers. A patch portion may be generated by one or more processors based on a difference between the image layer and the selected base portion. With these embodiments, the container image may be stored based on multiple image layers, and thus the container image may be maintained in a much finer granularity so as to reduce requirements on the bandwidth and time cost for transmitting the container image.

20 Claims, 5 Drawing Sheets

CONTAINER IMAGE MANAGEMENT

BACKGROUND

The present invention generally relates to container management. Specifically, the present invention relates to computer-implemented methods, computer-implemented systems and computer program products for managing a container image.

With developments of container techniques, more and more applications are built based on containers. A container image is a read-only template used to build containers. A worker node may send/obtain a container image to/from an image server. Depending on a function of the container, a size of a corresponding container image may reach several gigabytes.

SUMMARY

In one aspect, a computer-implemented method is disclosed. According to the method, an image layer in a container image may be received by one or more processors, and the container image is to be stored in an image server comprising a group of image layers. A base portion may be selected by one or more processors from the group of image layers based on a similarity analysis between the image layer and the group of image layers. A patch portion may be generated by one or more processors based on a difference between the image layer and the selected base portion.

In another aspect, a computer-implemented system is disclosed. The computing system comprises a computer processor coupled to a computer-readable memory unit, where the memory unit comprises instructions that when executed by the computer processor implements the above method.

In another aspect, a computer program product is disclosed. The computer program product comprises a computer readable storage medium having program instructions embodied therewith. The program instructions are executable by an electronic device to cause the electronic device to perform actions of the above method.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present embodiment in the accompanying drawings, the above and other objects, features and advantages of the present embodiment will become more apparent, wherein the same reference generally refers to the same components in the embodiments of the present embodiment.

Throughout the drawings, same or similar reference numerals represent the same or similar elements.

DETAILED DESCRIPTION

Figure 1:
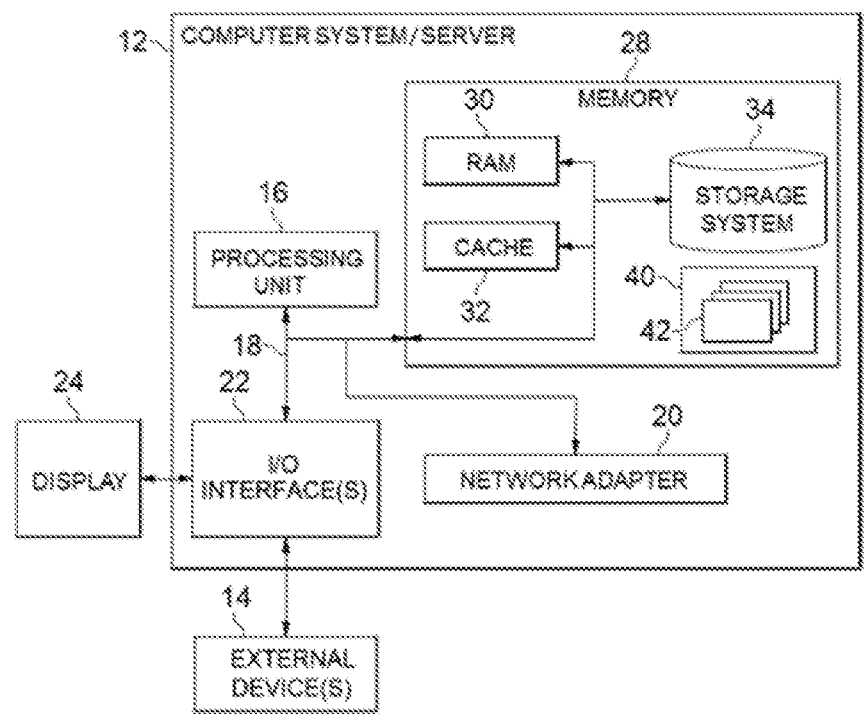
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
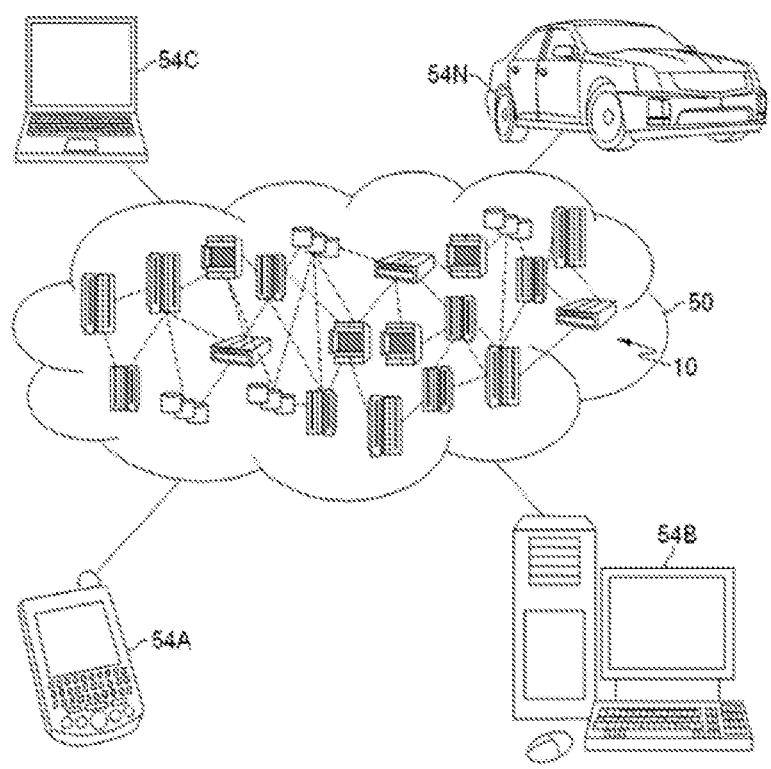
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
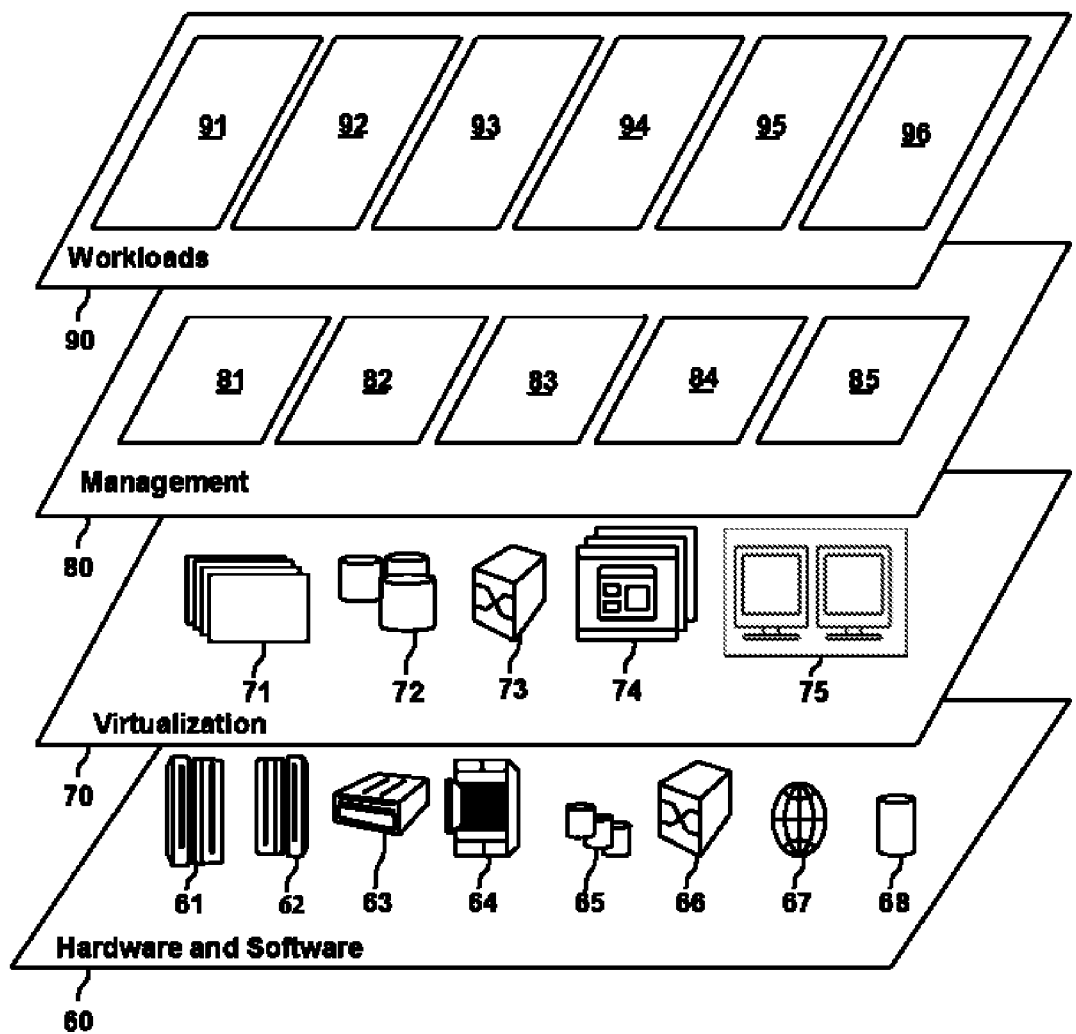
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image management 96.

It should be noted that the processing of container image management according to embodiments of this invention could be implemented by computer system/server 12 of FIG. 1. Hereinafter, reference will be made to FIG. 4 to FIG. 9 to describe details of the container image management 96.

Figure 4:
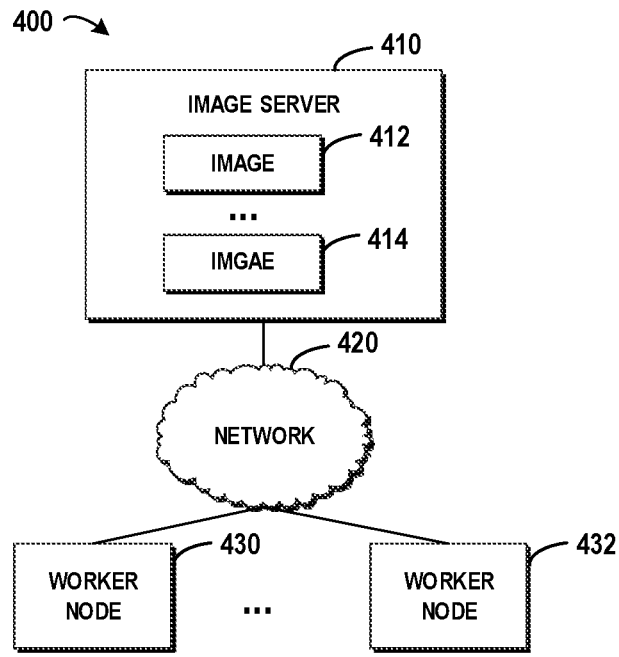
FIG. 4 depicts an example diagram of a container image system for managing container images according to a solution.

Nowadays, container techniques are widely adopted and a container may be built from a container image. In order to facilitate distributions of container images, an image server may be provided. Here, the image server may receive container images that are uploaded from a worker node and may share the received container images among multiple worker nodes. For the sake of description, embodiments of the present invention will be described by taking an image distribution system as an environment for implementing embodiments of the present invention. Reference will be made to FIG. 4 for a general description of the working environment. FIG. 4 depicts an example diagram 400 of a container image system 400 for managing container images according to a solution.

As shown in FIG. 4, the container image system 400 may comprise an image server 410 for storing a plurality of images 412, . . . , and 414. Further, a plurality of worker nodes 430, . . . , and 432 may connect to the image server 410 via a network 420. Here, the worker nodes 430, . . . , and 432 may upload container images to the image server 410, and then the uploaded images 412, . . . , and 414 may be shared among the multiple worker nodes 430, . . . , and 432.

According to the solution in FIG. 4, the container image 412, . . . , and 414 are uploaded/downloaded as a whole. Depending on functions of the container, the size of the container image may vary from megabytes to gigabytes.

Accordingly, for a container image with a relative greater size, a great time cost is introduced in sending/obtaining the container image, which in turn may greatly increase the time cost for the whole procedure for building the container. At this point, how to manage the container image in a more effective way becomes a focus.

In view of the above, embodiments of the present invention provides an effective solution for managing container images that may reduce resources that are caused during container image transmission. Usually, the container image may comprise one or more image layers. In some embodiments of the present invention, the container image may be stored in a unit of image layers instead of the whole image. Hereinafter, reference will be made to FIG. 5 for a general description of embodiments of the present invention.

Figure 5:
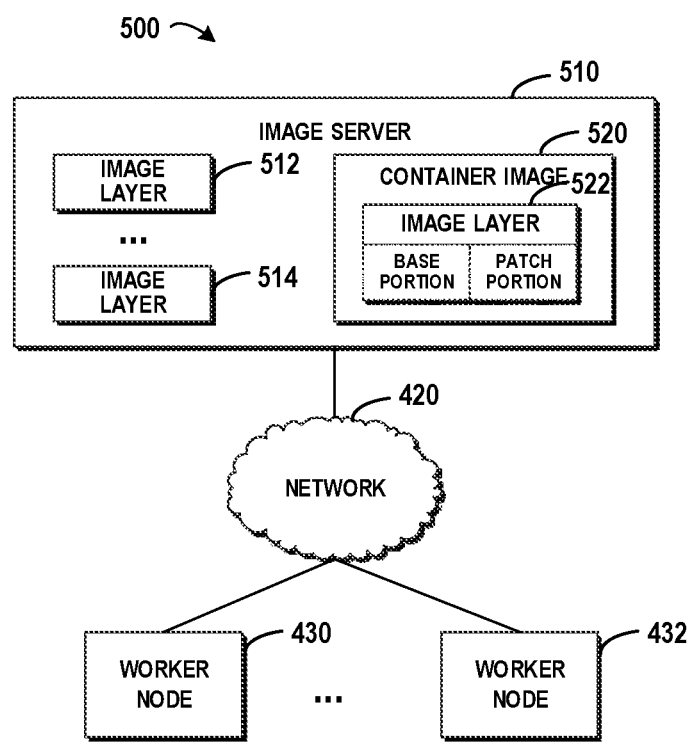
FIG. 5 depicts an example diagram for managing container images according to an embodiment of the present invention.

FIG. 5 depicts an example diagram 500 for managing container images according to an embodiment of the present invention. As shown in FIG. 5, multiple imager layers 512, . . . , and 514 may be stored in the image server 510. A container image 520 comprising at least the image layer 522 may be received from one of the worker nodes 430, . . . , and 432 via the network 420. Different from storing the container image 520 as a whole, the image layer 522 in the container image 520 may be compared with the group of image layers 512, . . . , and 514 based on a similarity analysis. If an image layer is similar as the image layer 522 (for example, an image layer is the same as a portion of the image layer 522 with a certain percentage), then the image layer may be determined as the base portion. Further, a patch portion may be generated based on a difference between the image layer 522 and the base portion. For example, 80% of the image layer 522 is the same as the image layer 514, and then a patch portion comprising the other 20% of the image layer 522 may be generated. Although FIG. 5 illustrates only one image layer 522 comprised in the container image 520 is processed by the solution of the present invention, some or all the image layers in the container image 520 may be processed in a similar way.

With these embodiments, the whole container image 520 may be stored based on multiple image layers. In other words, the image layer 522 in the container image 520 may be separated and stored as two individual sub-layers: one sub-layer corresponds to the base portion and the other sub-layer corresponds to the patch portion. Further, during uploading the container image 520 to the image server 510 and downloading the container image 520 from the image server 510, each of the multiple image layers may be transmitted individually. Therefore, the container image 520 may be maintained in a much finer granularity so as to reduce requirements on the bandwidth and time cost during transmission. Further, the image server 510 may be used for storing more container images.

Figure 6:
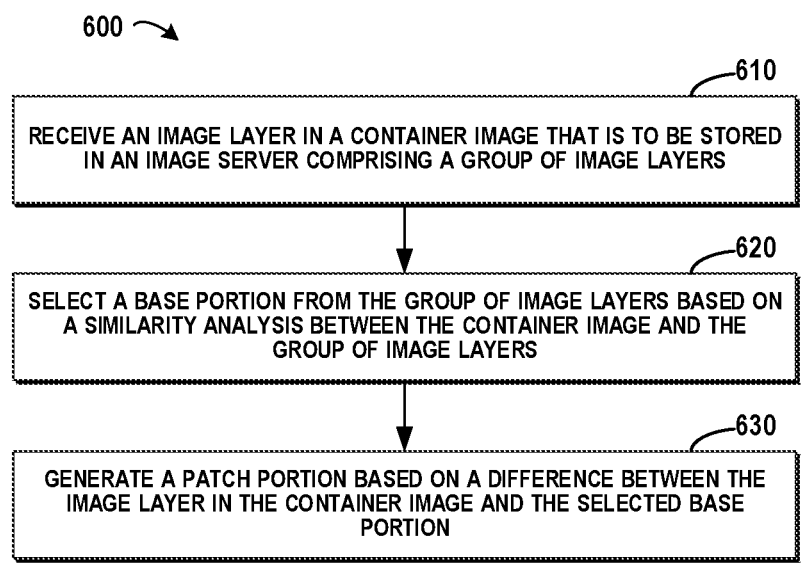
FIG. 6 depicts an example flowchart of a method for managing container images according to an embodiment of the present invention.

Reference will be made to FIG. 6 for details about how to manage the container images. FIG. 6 depicts an example flowchart of a method 600 for managing container images according to an embodiment of the present invention. At block 610, the image layer 522 of the container image 520 may be received. The container image 520 is to be stored in the image server 510 comprising a group of image layers 512, . . . , and 514. Here, the container image 520 may be uploaded from any of the multiple worker nodes 430, . . . , and 432 or another location.

At block 620, a base portion may be selected from the group of image layers 512, . . . , and 514 based on a similarity analysis between the image layer 522 in the container image 520 and the group of image layers. In some embodiments of the present invention, the image layer 522 in the container image 520 may be compared with the group of image layers 512, . . . , and 514, such that respective similarity levels may be determined between the image layer 522 and respective image layers in the group of image layers 512, . . . , and 514. Then, a layer that has a higher similarity level may be selected as the based layer based on the respective similarity levels.

By selecting an image layer that is similar with the image layer 522 in the container image 520 as the base portion, only a portion of the image layer 522 that is different from the base portion should be stored in the image server 510. Therefore, same layers in multiple container images are stored in the image server 510 only once, and thus the storage space in the image server 510 may reused for storing more container images.

It is to be understood that the similarity analysis may be implemented between layers in the whole container image 520 or a portion of the container image 520. Here, the similarity level may be represented by a percentage. For example, respective similarity levels may be determined between the image layer 522 and each of the image layers 512, . . . , and 514. Supposing the size of the image layer 522 is 100 M, and the size of the image layers 512, . . . , and 514 are 50 M, . . . , and 80 M, respectively. Based on similarity analysis, the similarity levels may be determined as 50%, . . . , and 80%, respectively. Therefore, the image layer 514 which has the greatest similarity may be selected as the base portion.

A block 630, a patch portion may be generated based on a difference between the image layer 522 in the container image 520 and the selected base portion. Continuing the above example, the difference between the image layer 522 and the base portion 514 relates to data other than the base portion in the image layer 522. Accordingly, the patch portion for the image layer 522 based on the image layer 514 may relate to the other 20 M data in the image layer 522. Similarly, when the image layer 512 is selected as the base portion, the patch portion may relate to 50 M data in the image layer 522.

Figure 7:
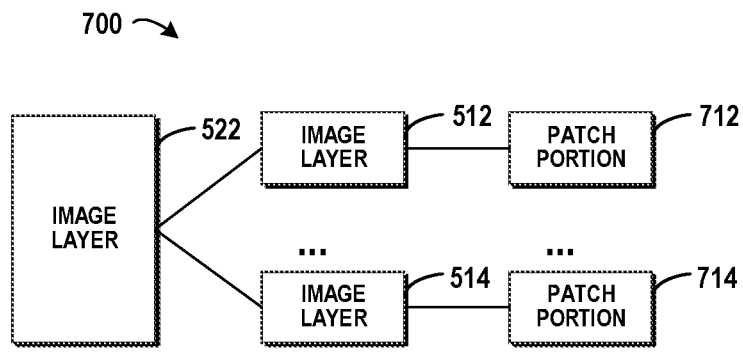
FIG. 7 depicts an example diagram for respective base portions and patch portions according to an embodiment of the present invention.

FIG. 7 depicts an example diagram 700 for respective base portions and patch portions according to an embodiment of the present invention. In FIG. 7, a patch portion 714 may be generated for the image layer 514. In some embodiments of the present invention, metadata may be determined for the container image 520 based on the base portion and the patch portion. Here, the metadata may indicate an organization of the container image 520. For the above container image 520, if the container image 520 comprises the image layer 522 and another image layer II, then the metadata may be represented by Table 1 as below:

TABLE 1

Metadata for Container Image

| No. | Container Image | Original Layer | Alternative Layer |
|---|---|---|---|
| 1 | container image 520 | image layer 522 | image layer 514 + patch portion 714 |
|  |  | image layer II | . . . |
| . . . | . . . | . . . |  |

In Table 1, the first column represents a serial number of the container image, the second column represents an identification of the container image, the third column represents image layers that are originally comprised in the container image, and the fourth column represents alternative layers (such as the base portion and the patch portion) determined based on the method 600. As shown in Table 1, the container image 520 may comprise the image layer 522 and image layer II, where the image layer 522 may be stored based on the image layer 514 and the patch portion 714. With these embodiments, the metadata may indicate all the layers that are comprised in the container image 520. Then, the patch portion may be stored in the image server associated with the metadata, such that layers in the container image 520 may be easily found by querying the metadata. In some embodiments of the present invention, the original image layer 522 may be stored in the image server 410. With these embodiments, the original image layer 522 and the (image layer 514+714) may provide multiple sources for downloading.

As the image server 510 usually comprises hundreds of or even more image layers. Multiple base portions may be selected from the image layers and a corresponding patch portion may be generated for each of the multiple base portions. Similar procedure may be implemented for determining the other base portions. In some embodiments of the present invention, multiple pairs of base portion and patch portion may be determined.

In the above example, the image layer 512 may be determined as the further base portion. Further, a patch portion 712 may be generated based on a difference between the image layer 522 and the image layer 512. Here, the patch portion may relate to 50 M data other than the image layer 512 in the image layer 522. Afterwards, the metadata as shown in Table 1 may be updated based on the image layer 512 and the patch portion 712, and then the patch portion 712 may be stored in the image server 510 associated with updated metadata. At this point, Table 1 may be updated to Table 2 as below.

TABLE 2

Metadata for Container Image

| No. | Container Image | Original Layer | Alternative Layer |
|---|---|---|---|
| 1 | container image 520 | image layer 522 | image layer 514 + patch portion 714 |
| | | | image layer 512 + patch portion 712; |
| | | | ... |
| | | image layer II | ... |
| ... | ... | ... | |

With these embodiments, the metadata may indicate multiple pairs of base portions and patch portions, such that alternative operations may be provided when a target container image is to be downloaded from the image server 510. During the downloading procedure, a patch portion that causes the lowest data transmission may be selected from the multiple pairs. Therefore, bandwidth resource and the time cost for downloading the container image from the image server 510 may be greatly reduced.

It is to be understood that the above Table 1 and Table 2 illustrates examples for the container image 520 that comprising two layers. In other examples, the container image 520 may comprise more or less layer, and any of the image layers may be compared with the multiple image layers 512, ... , and 514 based on the above method 600. With these embodiments, all or some of the layers in the container image 520 may be processed to determine whether a corresponding base portion that is stored in the image server 510 may be reused.

The above paragraphs have described how to manage the container image 520 when the container image 520 is uploaded to the image server 510. Sometimes, the worker node may request to download a target container image that is stored in the image server 510. In some embodiments of the present invention, a request may be received at the image server 510 from a worker node for obtaining the target container image. At this point, a copy of metadata may be determined for the target container image. In the copy of metadata, one or more pairs of base lays and patch portions may be indicated for finding layers in an image layer in the target container image. Usually, there may be some existing image layers in the worker node itself, and thus only layers that do not exist in the worker node should be transmitted to the worker node.

With these embodiments, less data should be downloaded from the image server 510, and thus the network transmission and time cost may be reduced. Hereinafter, reference will be made to FIG. 8 for describing details about downloading the target container image from the image server 510.

Figure 8:
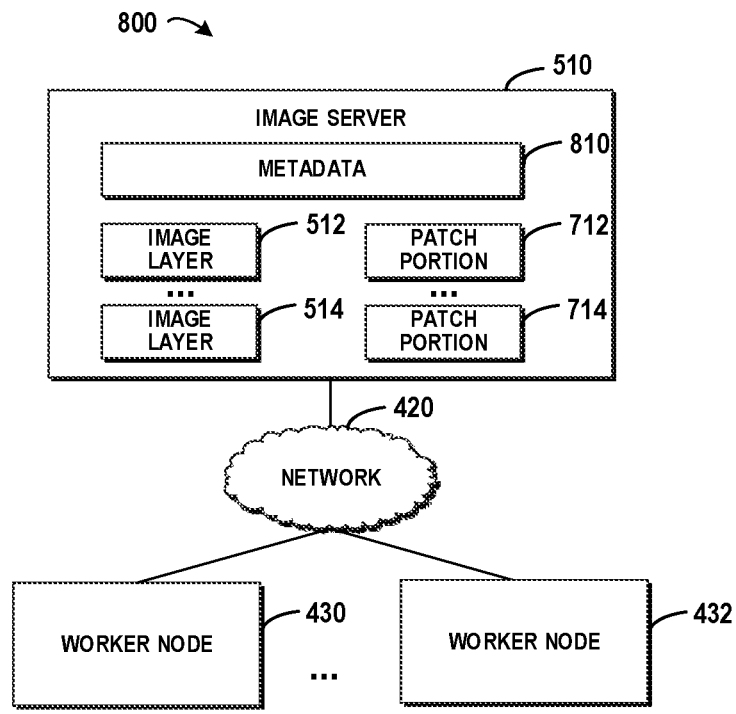
FIG. 8 depicts an example diagram for obtaining a target container image according to an embodiment of the present invention.

FIG. 8 depicts an example diagram 800 for obtaining an image layer in the target container image according to an embodiment of the present invention. As shown in FIG. 8, the image server 510 may comprise multiple image layers 512, ... , and 514, and multiple patch portions 712, ... , 714 that are generated according to the method 600 as described in preceding paragraphs. Further, the image server 510 may comprise metadata 810 for defining an organization between a container image and image layers comprised in the container image.

In some embodiments of the present invention, steps relating to downloading may be implemented by an image agent. Here, the image agent may be a component between the image server 510 and the worker nodes 430, ... , and 432, and operations of the image agent may be transparent to the worker nodes. At this point, the worker nodes may work as usual during uploading the container image 520 to the image server 510 and downloading the container image 520 from the image server 510.

In some embodiments of the present invention, the image agent may be implemented at the worker node. For example, an image agent may be deployed at the worker node 430, and an image agent may be deployed at the worker node 432 (not shown in FIG. 8). With these embodiments, the image agent may easily collect information about the worker node. For example, the image agent may directly determine how many layers are located in the worker node and what layers are located in the worker node.

In some embodiments of the present invention, the image agent may be deployed in a centralized manner for controlling multiple worker nodes that are connected to the image server 510. With these embodiments, only one image agent should be deployed in the network system, and the workload for each of the worker node may be alleviated and thus the worker node may focus on its own work.

Figure 9:
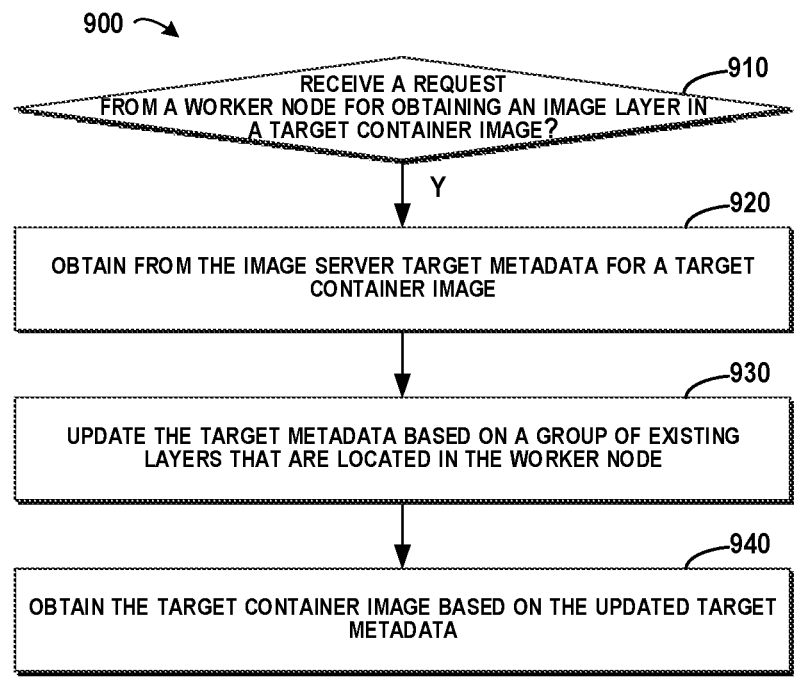
FIG. 9 depicts an example flowchart of a method for obtaining a target container image according to an embodiment of the present invention.

In some embodiments of the present invention, the copy of metadata for the to-be-downloaded image may be updated based on the group of existing image layers, and then at least one image layer may be sent to the worker node based on the updated copy of metadata. Here, the copy of metadata may be updated with the pair(s) that includes the existing image layers in the worker node. Reference will be made to FIG. 9 for describing details about how to obtaining the target container from the image server 510. It is to be understood that, only the copy of the metadata is updated during a procedure for downloading an image, and the original version of the metadata at the image server 510 is not changed.

FIG. 9 depicts an example flowchart of a method 900 for obtaining a target container image according to an embodiment of the present invention. At block 910, a request may be sent from the worker node 430 for obtaining an image layer in the target container image. For example, the worker node 430 may request to download the image layer 522 in the container image 520 that is uploaded to the image server 510. At block 920, the copy of metadata may be obtained from the image server 510. At this point, the first entry in Table 2 may be sent to the image agent for further processing. Here, the copy of metadata comprises several pairs of layers for the image layer 522: (1) the image layer 514+the patch portion 714; and (2) the image layer 512+the patch portion 712; and other pairs of layers.

At block 930, the copy of metadata may be updated based a group of existing image layers that are located in the worker node. In one example, if the worker node 430 comprises the image Layer 514, then only the pair of layers that including the image layer 514 may be maintained in the updated copy of metadata and the other pair of layers may be removed. At block 940, the image layer 522 in the target container image may be obtained based on the updated copy of metadata. Specifically, a patch portion may be identified from the updated copy of metadata, and then the identified target patch portion may be sent to the worker node. In this example, the update copy of metadata shows that the target container image 520 may be built based on the image layer 514 and the patch portion 714. As the image layer 514 is already located at the worker node 430, only the patch portion 714 will be downloaded from the image server 510. At the worker node 430, the image layer 522 may be built from the image layer 514 and the downloaded patch portion 714.

In some embodiments of the present invention, there may be more pairs of base portions and patch portions. At this point, a patch portion that causes lower data transmission may be selected and sent to the worker node. If the worker node 430 comprises the image layer 512 and 514, the pairs comprising the image layer 512 and 514 may be maintained in the updated metadata, while other pairs may be removed. Further, a size of the patch portion 712 and a size of the patch portion 714 may be compared to identify a target layer that may reduce the network transmission. In this example, the patch portion 712 is 50 M and is greater than the patch portion 714 of 20 M. Therefore, the patch portion 714 may be identified and downloaded from the image server 510. With these embodiments, a patch portion with a relative smaller size may be transmitted to the worker node 430 for reducing the network transmission.

In some embodiments of the present invention, if the original image layer 522 is stored in the image server 410, the copy of metadata may comprise the following sources for the image layer 522: (1) the original image layer 522; (2) the image layer 514+the patch portion 714; (3) the image layer 512+the patch portion 712; and other pairs of layers. At this point, the above sources may be compared to determine a source that may reduce the network transmission for the download. Further, the image layer 522 may be downloaded based on the determined source.

Sometimes, the worker node may contain no layer that is indicated by any layer pair in the copy of metadata. At this point, layers indicated by the copy of metadata may be directly sent to the worker node. In other words, if the existing image layers in the worker node and layers indicated by the copy of metadata are not overlapped, the layers indicated by the copy of metadata may be sent to the worker node. For example, if the worker node 430 sends a request for downloading the container image 520 and the worker node 430 comprises no image layers that are defined in the copy of metadata, then layers indicated by any of the above two pairs may be downloaded to the worker node 430. In one example, the image layer 514 and the patch portion 714 may be downloaded. In another example, the image layer 512 and the patch portion 712 may be downloaded. In another example, if the image server 510 comprises the image layer 522, then the image layer 522 may be downloaded directly.

According to embodiments of the present invention, the image layer 522 in the container image 520 may be managed in the unit of image layers. Further, the metadata 810 may define image layers that are comprised in the image layer 522 in the container image 520. With the image layers and the metadata 810, layer(s) in the container image 520 may be managed in much finer granularity and thus only one copy of image layers that are shared by multiple container images maybe stored in the image server 510. Therefore, the image layers may be reused by multiple container images and thus the storage in the image server may be utilized effectively.

An embodiment of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, an image layer in a container image that is to be stored in an image server comprising a group of image layers;
   selecting, by one or more processors, a base portion from the group of image layers based on a similarity analysis between the image layer and the group of image layers; and
   generating, by one or more processors, a patch portion based on a difference between the image layer and the selected base portion.

2. The method of claim 1, wherein the selecting the base portion comprises:
   determining, by one or more processors, respective similarity levels between the image layer and respective image layers in the group of image layers; and
   selecting, by one or more processors, the base portion that has a higher similarity level from the group of image layers based on the respective similarity levels.

3. The method of claim 1, further comprising:
   determining, by one or more processors, metadata for the container image based on the base portion and the patch portion; and
   storing, by one or more processors, the patch portion in the image server associated with the metadata.

4. The method of claim 3, further comprising:
   selecting, by one or more processors, a further base portion from the group of image layers;
   generating, by one or more processors, a further patch portion based on a further difference between the image layer and the further base portion;
   updating, by one or more processors, the metadata for the container image based on the further base portion and the further patch portion; and
   storing, by one or more processors, the further patch portion in the image server associated with updated metadata.

5. The method of claim 3, further comprising:
obtaining, by one or more processors, a copy of metadata for a target container image in response to receiving from a worker node a request for obtaining the target container image; and
sending, by one or more processors, at least one image layer to the worker node based on the copy of metadata and a group of existing image layers that are located in the worker node.

6. The method of claim 5, wherein the sending the at least one image layer comprises:
updating, by one or more processors, the copy of metadata based on the group of existing image layers; and
sending, by one or more processors, the at least one image layer to the worker node based on the updated copy of metadata.

7. The method of claim 6, wherein the updating the copy of metadata comprises:
updating, by one or more processors, the copy of metadata based on an existing image layer in the group of existing image layers that is indicated in the copy of metadata.

8. The method of claim 7, wherein the sending the at least one image layer comprises:
identifying, by one or more processors, a target patch portion from the updated copy of metadata; and
sending, by one or more processors, the identified target patch portion to the worker node.

9. The method of claim 7, wherein the sending the at least one image layer comprises:
determining, by one or more processors, from the updated copy of metadata a first target patch portion and a second patch portion in response to a plurality of patch portions being indicated by the updated copy of metadata;
identifying, by one or more processors, a target patch portion from the first target patch portion and the second patch portion based on a comparison between a size of the first target layer and a size of the second target layer; and
sending, by one or more processors, the identified target patch portion to the worker node.

10. The method of claim 7, wherein the sending the at least one image layer comprises:
sending, by one or more processors, at least one image layer indicated by the copy of metadata to the worker node in response to no existing image layer in the group of existing image layers being indicated by the copy of metadata.

11. A computer-implemented system, comprising a computer processor coupled to a computer-readable memory unit, the memory unit comprising instructions that when executed by the computer processor implements a method comprising:
receiving an image layer in a container image that is to be stored in an image server comprising a group of image layers;
selecting a base portion from the group of image layers based on a similarity analysis between the image layer and the group of image layers; and
generating a patch portion based on a difference between the image layer and the selected base portion.

12. The system of claim 11, wherein the selecting the base portion comprises:
determining respective similarity levels between the image layer and respective image layers in the group of image layers; and
selecting the base portion that has a higher similarity level from the group of image layers based on the respective similarity levels.

13. The system of claim 11, further comprising:
determining metadata for the container image based on the base portion and the patch portion; and
storing the patch portion in the image server associated with the metadata.

14. The system of claim 13, further comprising:
selecting a further base portion from the group of image layers;
generating a further patch portion based on a further difference between the image layer and the further base portion;
updating the metadata for the container image based on the further base portion and the further patch portion; and
storing the further patch portion in the image server associated with updated metadata.

15. The system of claim 13, further comprising:
obtaining a copy of metadata for a target container image in response to receiving from a worker node a request for obtaining the target container image; and
sending at least one image layer to the worker node based on the copy of metadata and a group of existing image layers that are located in the worker node.

16. The system of claim 15, wherein the sending the at least one image layer comprises:
updating the copy of metadata based on the group of existing image layers; and
sending the at least one image layer to the worker node based on the updated copy of metadata.

17. The system of claim 16, wherein the updating the copy of metadata comprises:
updating the copy of metadata based on an existing image layer in the group of existing image layers that is indicated in the copy of metadata.

18. The system of claim 17, wherein the sending the at least one image layer comprises:
identifying a target patch portion from the updated copy of metadata; and
sending the identified target patch portion to the worker node.

19. The system of claim 17, wherein the sending the at least one image layer comprises:
determining from the updated copy of metadata a first target patch portion and a second patch portion in response to a plurality of patch portions being indicated by the updated copy of metadata;
identifying a target patch portion from the first target patch portion and the second patch portion based on a comparison between a size of the first target layer and a size of the second target layer; and
sending the identified target patch portion to the worker node.

20. A computer program product, the computer program product comprising a computer readable storage medium having program instructions embodied therewith, the program instructions executable by an electronic device to cause the electronic device to perform actions of:
receiving an image layer in a container image that is to be stored in an image server comprising a group of image layers;
selecting a base portion from the group of image layers based on a similarity analysis between the image layer and the group of image layers; and generating a patch portion based on a difference between the image layer and the selected base portion.

\* \* \* \* \*